Dec. 21, 1948. H. C. ELLIS Re. 23,065

WASHING MACHINE WITH PIVOTALLY SUPPORTED OUTER AND INNER SHELLS AND POWER MEANS ON THE OUTER SHELL FOR ROTATING THE INNER SHELL

Original Filed Nov. 27, 1944 7 Sheets-Sheet 1

Inventor
Hubert C. Ellis
By: Fred Gerlach Atty

Dec. 21, 1948. H. C. ELLIS Re. 23,065

WASHING MACHINE WITH PIVOTALLY SUPPORTED OUTER AND INNER SHELLS AND POWER MEANS ON THE OUTER SHELL FOR ROTATING THE INNER SHELL

Original Filed Nov. 27, 1944 7 Sheets-Sheet 2

Inventor
Hubert C. Ellis
By: Fred Gerlach Atty.

Dec. 21, 1948. H. C. ELLIS Re. 23,065

WASHING MACHINE WITH PIVOTALLY SUPPORTED OUTER AND INNER SHELLS AND POWER MEANS ON THE OUTER SHELL FOR ROTATING THE INNER SHELL

Original Filed Nov. 27, 1944 7 Sheets-Sheet 3

Inventor
Hubert C. Ellis
By: Fred Gerlach
Atty.

Dec. 21, 1948. H. C. ELLIS Re. 23,065

WASHING MACHINE WITH PIVOTALLY SUPPORTED OUTER AND INNER SHELLS AND POWER MEANS ON THE OUTER SHELL FOR ROTATING THE INNER SHELL

Original Filed Nov. 27, 1944 7 Sheets-Sheet 4

Inventor
Hubert C. Ellis
By Fred Gerlach Atty.

WASHING MACHINE WITH PIVOTALLY SUPPORTED OUTER AND INNER SHELLS AND POWER MEANS ON THE OUTER SHELL FOR ROTATING THE INNER SHELL

Original Filed Nov. 27, 1944 7 Sheets-Sheet 5

Inventor
Hubert C. Ellis
By Reed Oberlank
Atty.

Dec. 21, 1948. H. C. ELLIS Re. 23,065

WASHING MACHINE WITH PIVOTALLY SUPPORTED OUTER AND INNER SHELLS AND POWER MEANS ON THE OUTER SHELL FOR ROTATING THE INNER SHELL

Original Filed Nov. 27, 1944 7 Sheets-Sheet 6

Inventor
Hubert C. Ellis
By Fred Gerlach atty

Dec. 21, 1948. H. C. ELLIS Re. 23,065

WASHING MACHINE WITH PIVOTALLY SUPPORTED OUTER AND INNER SHELLS AND POWER MEANS ON THE OUTER SHELL FOR ROTATING THE INNER SHELL

Original Filed Nov. 27, 1944 7 Sheets-Sheet 7

Inventor
Hubert C. Ellis
By: Fred Gerlach
Atty.

Reissued Dec. 21, 1948

Re. 23,065

UNITED STATES PATENT OFFICE 23,065

WASHING MACHINE WITH PIVOTALLY SUPPORTED OUTER AND INNER SHELLS AND POWER MEANS ON THE OUTER SHELL FOR ROTATING THE INNER SHELL

Hubert C. Ellis, Evanston, Ill., assignor to The Ellis Drier Co., Chicago, Ill., a corporation of Illinois Original No. 2,436,883, dated March 2, 1948, Serial No. 565,234, November 27, 1944. Application for reissue October 8, 1948, Serial No. 53,402

16 Claims. (Cl. 68—140)

In general the present invention relates to machines for washing clothes and like articles. More particularly the invention relates to that type of washing machine which is of comparatively large capacity and as its principal components or parts comprises: (1) a cylindrical horizontally extending outer shell which is provided with means for supplying it with a washing fluid, such as water, and embodies at the upper portion of its side wall a door closed opening and at its bottom a dump valve for ridding it of water after a washing operation; (2) a cylindrical horizontally extending foraminous inner shell which is adapted to hold the clothes and like articles to be washed, has means for supporting it so that it is rotatable about its longitudinal axis relatively to the outer shell, and embodies a door closed opening for permitting the clothes to be inserted into and removed from the interior of the inner shell when such opening is in registry with the opening in the outer shell and its door and the door for the outer shell opening are open; and (3) power mechanism which is associated with the outer shell, serves when in operation to rotate the inner shell back and forth and consists of a reversible electric motor and speed reducing gearing between the motor and the inner shell.

One object of the invention is to provide a washing machine of this type which is an improvement upon, and has a certain inherent advantages over, previously designed machines and is characterized by the fact that it may be operated with greater facility and at a greater speed.

Another object of the invention is to provide a washing machine of the type under consideration in which the power mechanism for rotating the inner shell back and forth is mounted entirely on the outer shell and the outer shell is pivotally connected to a stationary supporting structure so that it may be swung bodily upwards throughout substantially an arc of 90° into a discharging position wherein the opening in its side wall faces downwards.

Another object of the invention is to provide a washing machine of the last mentioned type and character which includes a comparatively simple hydraulic system for swinging the cylindrical outer shell back and forth between its normal operating position and its discharging position.

A further object of the invention is to provide a washing machine of the type and character under consideration in which the means for supplying the outer shell with water comprises a fitting which is mounted on the stationary supporting structure and has an outlet, and also comprises a pipe section which is mounted fixedly on, and in communication with the interior of, the outer shell and is arranged so that it registers with the outlet of the fitting when the outer shell is in its normal operating position.

A still further object of the invention is to provide a washing machine which is generally of new and improved construction and effectively and efficiently accomplishes its intended purpose.

Other objects of the invention and the various advantages and characteristics of the present washing machine will be apparent from a consideration of the following description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views.

Figure 1:
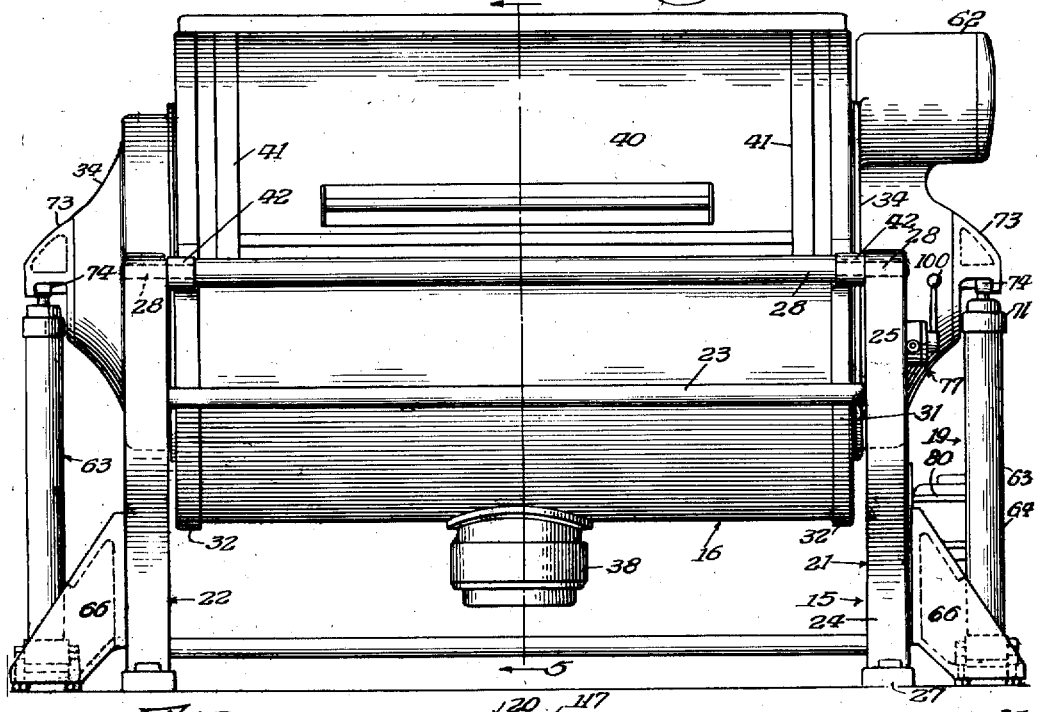
Figure 1 is a front elevation of a washing machine embodying the invention, the outer shell being shown in its normal operating position.
Figure 2:
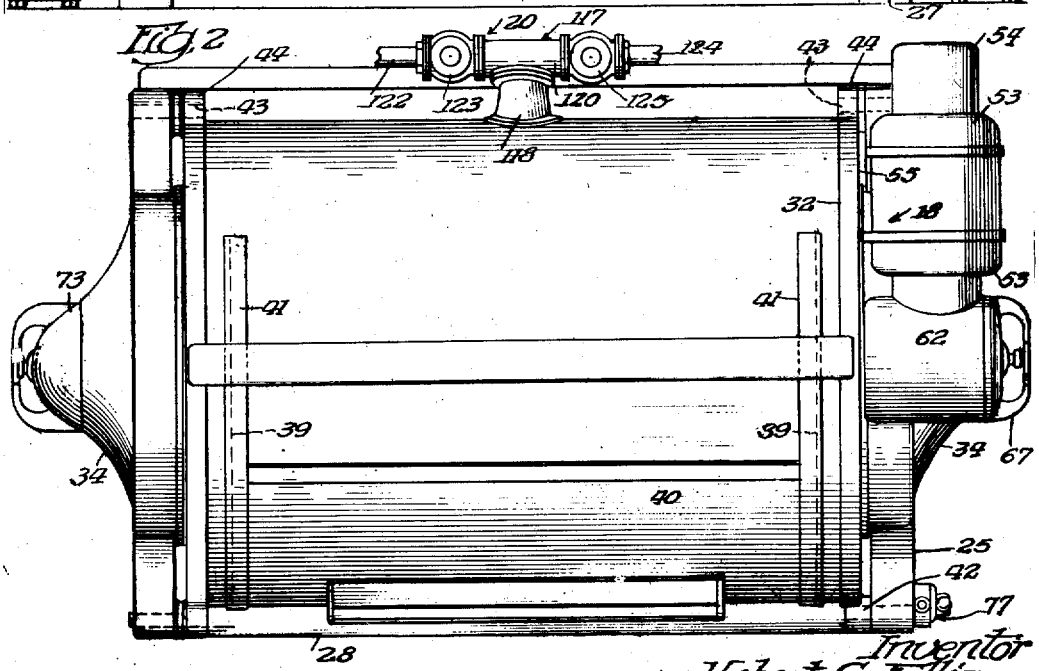
Figure 2 is a plan view of the machine.

The machine which is shown in the drawings constitutes the preferred form or embodiment of the invention. It is primarily designed for use in a commercial or large sized laundry, serves as a medium for washing clothes and like articles and comprises a supporting structure 15, a cylindrical horizontally extending outer shell 16, a cylindrical horizontally extending inner shell 17, power mechanism 18 for operating the inner shell, a system 19 of the hydraulic variety for swinging the outer shell together with the inner shell and the power mechanism back and forth between a normal operating position and a discharging position, and means 20 for supplying the outer shell with a washing fluid, such as water, when the outer shell is in its normal operating position.

The supporting structure 15 is adapted to rest on, and be fixedly secured to, the floor of the laundry or other establishment in which the washing machine is used. It remains stationary when in use and consists of a pair of laterally spaced U-shaped standards 21 and 22 and a plurality of tie rods 23 between the two standards. The two standards are positioned in horizontal alignment and embody base portions 24, upstanding front arms 25 and upstanding rear arms 26. They are preferably in the form of metallic castings and have floor engaging feet 27 on the bottom of their base portions 24. The tie rods 23 serve fixedly to space apart the two standards 21 and 22 and have the ends thereof suitably secured to the arms and base portions of the standards. In addition to the parts heretofore mentioned the supporting structure 15 comprises a horizontally extending shaft 28 and a bar 29. The shaft 28 extends between, and is fixedly connected to, the upper extremities of the front arms 25 of the two standards. The bar 29 is disposed in parallel relation with the shaft 28 and extends between, and is suitably secured to, the upper extremities of the rear arms 26 of the standards 21 and 22.

The outer shell 16 is positioned between the U-shaped standards 21 and 22 of the supporting structure 15 and embodies a cylindrical side wall 30 and a pair of circular or disc-like end walls 31. As shown in Figure 1 the end walls 31 are provided with inwardly extending annular flanges 32 and these extend around, and are welded or otherwise fixedly secured to, the ends of the cylindrical side wall 30. In addition to the flanges 32 the end walls 31 are provided with centrally positioned bearings 33 and exteriorly disposed cup-shaped housings 34. The bearings 33 are disposed in circular holes 35 within the central portions of the end walls 31 and have radially extending flanges 36 which are bolted to the hole defining portions of the end walls 31. The housings 34 serve to house the bearings 33 and are positioned centrally with respect to the end walls. They overlie the standards of the supporting structure and have on the free margins of their side walls radially extending flanges 37 which fit flatly against, and are bolted to, the outer faces of the end walls 31. The outer shell 16 is adapted in connection with operation of the machine to be charged with water by way of the supply means 20 and embodies a dump valve 38 whereby the water may be discharged from the interior of the outer shell at the conclusion of a washing operation.

Figure 3:
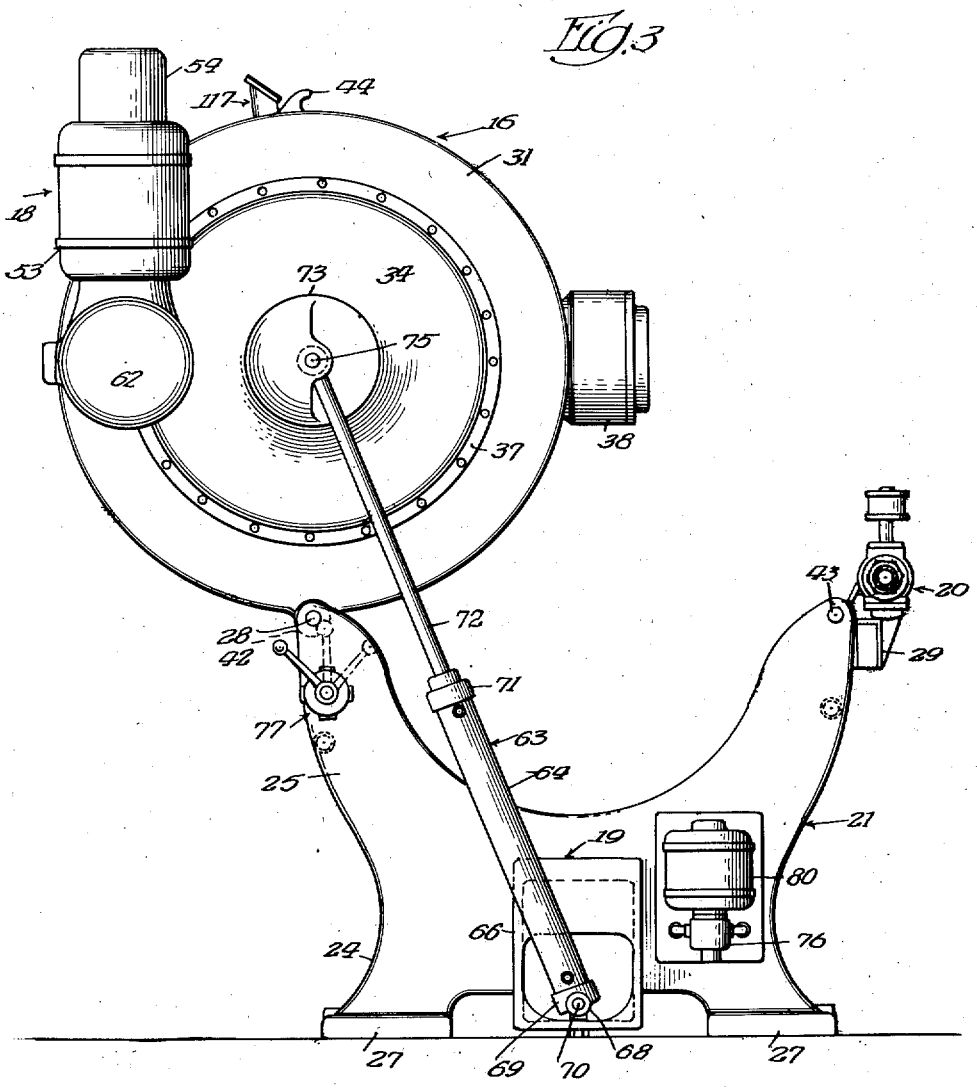
Figure 3 is an end view showing the outer shell swung upwards into its discharging position.

The dump valve 38 is of any suitable variety or type and is connected to the bottom portion of the side wall 30 of the outer shell. The side wall 30 embodies in the front upper portion thereof a rectangular opening 39 and this is closed by a door 40. The latter is arcuate in cross section and is mounted by way of arcuate end tracks or guides 41 in order that it may be slid upwards and circumferentially with respect to the side wall of the outer shell into an open position wherein it exposes the opening 39 for clothes charging and discharging purposes. The lower marginal portion of the door is provided with suitable latches for locking the door in its closed position. The front central portions of the inwardly extending flanges 32 on the end walls 31 are provided with collar-like elements 42 and these surround the ends of the shaft 28 of the supporting structure 15 and form pivotal connections for the outer shell whereby the latter is permitted to swing bodily upwards through substantially an arc of 90° into a discharging position wherein the opening in its side wall faces downwards, as shown in Figure 3. The outer shell 16 is supported in its normal operating position by means of a pair of pins 43 and a pair of hooks 44. The pins 43 are fixedly connected to, and extend inwards from, the upper extremities of the rear arms 26 of the standards of the supporting structure and the hooks 44 are connected to, and project rearwards from, the rear central portions of the flanges 32 on the end walls 31 of the outer shell and are adapted to rest on the inner ends of the pins when the outer shell is in its normal operating position. It is contemplated that the machine will be charged with the clothes and like articles to be washed while the outer shell is in its normal operating position and the power mechanism 18 is at rest. After charging of the machine the mechanism 18 is set in motion for clothes washing purposes. At the end of the clothes washing operation the power mechanism 18 is stopped and the door 40 is slid into its open position so as to expose the opening 39 in the upper front portion of the side wall 30 of the outer shell. After sliding the door into its open position the outer shell is swung upwards and forwards into its discharging position wherein the opening 39 faces downward and permits the clothes and other articles to fall by gravity out of the outer shell. After discharge of the clothes and other articles the outer shell is swung rearwards and downwards into its normal operating position wherein it is supported as a result of the hooks 44 resting on the inner ends of the pins 43.

The inner shell 17 is disposed concentrically within the outer shell 16 and is adapted to hold the clothes and other articles during a washing operation. It is driven or rotated as hereinafter described by the power mechanism 18 and consists of a foraminous cylindrical side wall 45 and a pair of circular or disc-like end walls 46. The end walls are positioned directly inwards of the end walls 31 of the outer shell 16 and have outwardly extending flanges 47 which fit within, and are welded or otherwise fixedly secured to, the ends of the foraminous side wall 45. The central portions of the end walls 46 of the inner shell are provided with outwardly extending trunnions 48 and these are journalled in, and extend through, the bearings 33 and serve to support the inner shell so that it is rotatable relatively to the outer shell. The cylindrical side wall 45 of the inner shell embodies inwardly projecting longitudinally extending ribs 49 for clothes tumbling purposes and has a rectangular opening 50. The latter is closed by a door 51 which is of arcuate cross section and has tracks or guides 52 at its ends in order that it may be slid circumferentially with respect to the inner shell into an open position wherein it exposes the opening 50. By reason of the fact that the side wall of the inner shell is foraminous the water in the outer shell is permitted to flow through the interior of the inner shell into contact with the clothes and other articles to be washed. In connection with charging of the machine the inner shell, after first opening the door 40 for the opening 39 in the outer shell, is rotated until the opening 50 in the innner shell is in registry with the opening 39. Thereafter the door 51 is slid into its open position and the inner shell is charged with clothes and other articles to be washed. Upon closing of the doors 51 and 40 the machine is in readiness for a washing operation.

Figure 6:
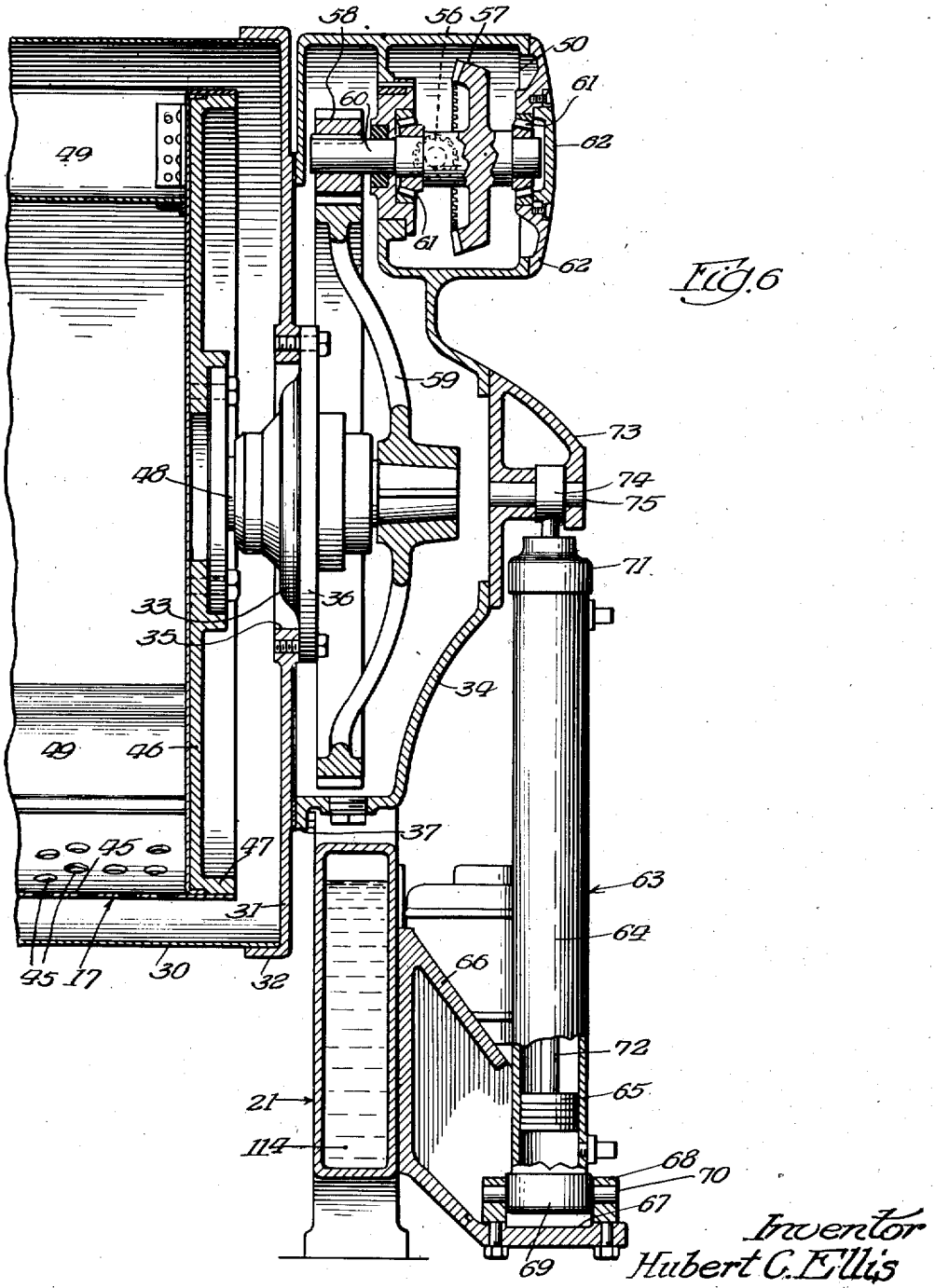
Figure 6 is an enlarged fragmentary vertical longitudinal section taken on the line 6—6 of Figure 4 and illustrating in detail the construction, arrangement and manner of mounting of the power mechanism for rotating the inner shell back and forth relatively to the outer shell.

The power mechanism 18 serves in connection with operation of the machine, to rotate the inner shell back and forth relatively to the outer shell and comprises a reversible electric motor 53 and speed reducing gearing between the motor and the inner shell. The electric motor 53 embodies a conventional solenoid brake 54 and is mounted on a bracket 55 on the housing 34 that is adjacent the stardard 21. The speed reducing gearing constituting part of the power mechanism 18 comprises a bevel pinion 56, a bevel gear 57, a pinion 58 and a gear 59. The bevel pinion 56 is mounted on one end of the armature shaft of the electric motor 53 and meshes with, and serves to drive, the bevel gear 57. The latter, as shown in Figure 6, is mounted on the outer end of a horizontally extending shaft 60 which is positioned in parallel relation with the axis of the outer shell 16 and is supported by roller bearings 61. The pinion 58 is keyed or otherwise fixedly secured to the inner end of the shaft 60 and meshes with, and serves to drive, the gear 59. Such gear is disposed in the housing 34 that is adjacent the standard 21 and has the hub thereof connected fixedly to the outer end of the adjacent trunnion 48. The upper portion of the housing 34 that is adjacent the standard 21 embodies an enlargement 62 which serves to house the bevel pinion 56, the bevel gear 57, the pinion 58 and also to support the bearings 61 in which the shaft 60 is journalled. When the machine is in operation the electric motor 53 is driven in one direction for a predetermined period of time and then in the opposite direction for a like period and hence causes the inner shell to rotate back and forth relatively to the outer shell. By reason of the fact that the power mechanism 18 consisting of the reversible electric motor 53 and the speed reducing gearing between the motor and the inner shell is mounted in its entirety on the outer shell 16 it moves bodily with the outer shell in connection with swing of the latter back and forth between its normal operating position and its discharging position and hence it is at all times in operative or driving relation with the inner shell regardless of the position of the outer shell.

The hydraulic system 19 for swinging the outer shell 16 together with the inner shell 17 and the power mechanism 18 back and forth between its normal operating position and its discharging position, comprises a pair of cylinder and piston devices 63 and these are located directly outwards of the standards of the supporting structure 15 and consists of cylinders 64 and pistons 65. The lower ends of the cylinders are pivotally connected to brackets 66 on the base portions 24 of the standards in order that the devices 63 are permitted to swing laterally in parallel relation with the standards. The brackets 66 are preferably in the form of metallic castings and project outwards and downwards from the base portions of the standards. They embody horizontally extending lower parts 67 and these, as best shown in Figure 6, embody pairs of spaced apart fixed bearings 68. The lower ends of the cylinders 64 are closed by fixed caps 69 which embody diametrically opposite pintles 70. The latter are journalled in the bearings 68 and together with said bearings form the pivotal connections between the cylinders 64 and the brackets 66. The upper ends of the cylinders 64 are closed by means of cup shaped caps 71 which are connected in place by screw thread connections (not shown) and have centrally disposed stuffing boxes (also not shown). The pistons 65 of the piston and cylinder devices are mounted in the cylinders 64 for longitudinal sliding movement and embody fixedly connected upstanding piston rods 72 which extend slidably through the stuffing boxes in the cup shaped caps 71. The upper ends of the piston rods are pivotally connected to brackets 73 on the central portions of the housings 34 by means of sleeve-like elements 74 and pins 75. The brackets 73 are suitably attached or connected to the central portions of the housings 34 and carry the pins 75 so that they are in axial alignment with the trunnions 48 of the end walls of the inner shell 17. The sleeve-like elements 74 are fixedly connected to the upper ends of the piston rods and are rotatably mounted on the pins 75, as shown in Figure 6. When fluid under pressure, such, for example, as oil, is introduced into the lower ends of the cylinders 64 while the upper ends of the cylinders are vented the pistons 65 together with the piston rods 72 are caused to slide upwards and result in the outer shell 16 together with the inner shell 17 and the power mechanism 18 being swung upwards and forwards from its normal operative position into its discharging position. When oil under pressure is introduced into the upper end of the cylinders while the lower ends of the cylinders are vented the pistons 65 and the piston rods 72 are slid downwards and cause the outer shell together with the parts associated therewith to swing rearwards and downwards into its normal operating position wherein it is supported by way of the pins 43 and the hooks 44. In connection with upward or downward sliding of the pistons and piston rods the cylinder and piston devices 63 swing laterally with the pintles 70 as articulation points. The stroke of the pistons 65 is such that the outer shell 16 in connection with swing thereof, either into or out of its discharging position, swings throughout substantially an arc of 90°. When the outer shell is in its normal operating position the trunnions 48 are horizontally aligned with the shaft 28 and when the outer shell is in its discharging position wherein the opening in the side wall thereof faces downwards the trunnions 48 are vertically aligned with said shaft 28. As a result of the fact that the trunnions 48 are in alignment with the shaft 28 when the outer shell is in its discharging position the outer shell is in substantially balanced relation with the shaft and hence the tendency of the machine as a whole to tilt or tip over is reduced to a minimum.

Figure 4:
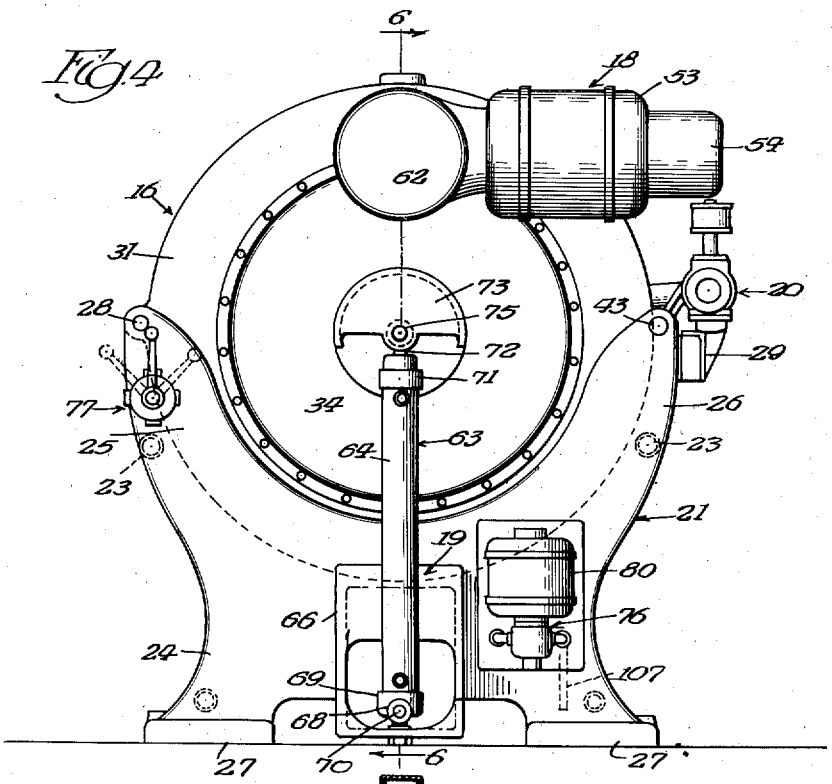
Figure 4 is an end view showing the outer shell in its normal operating position.

In addition to the cylinder and piston devices 63 the hydraulic system 19 comprises a gear pump 76, a control valve 77 and a particular pipe arrangement whereby oil under pressure may be delivered selectively into the lower ends of the cylinders 64 or into the upper ends of the cylinders. The gear pump 76 is mounted on the outer wall of the base portion 24 of the standard 21 and, as shown in Figures 3 and 4, is located beneath the rear arm 26 of said standard. It is of conventional design and consists of a casing 78 and a pair of meshing gears 79 in the casing. One of the gears is connected for drive by a unidirectional electric motor 80 which is mounted on the outer wall of the base portion 24 of the standard 21 and is supplied with current by a pair of conductors 81 and 82. The conductor 81 includes a normally open switch 83 consisting of a pair of fixed spaced apart contacts 84 and 85 and a bridge 86 for the two contacts. The bridge is urged away from the contacts by a compression spring 87 and has a push button 88 whereby it may be shifted against the force of the spring into a closed position wherein it cross connects the two contacts 84 and 85 and results in flow of current to the electric motor 80. When the switch 83 is in its closed position the motor 80 operates to drive the gear pump 76. The casing 78 of the pump includes an inlet port 89 and an outlet port 90.

Figure 7:
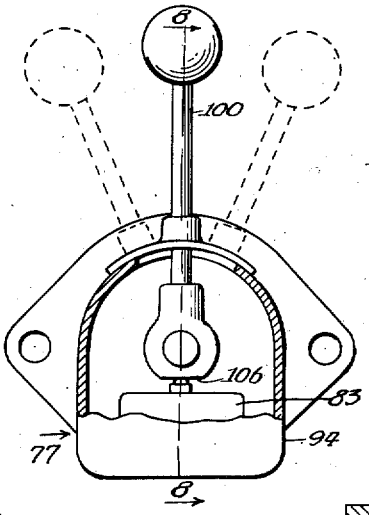
Figure 7 is an end view of the control valve for the hydraulic system that serves to swing the outer shell back and forth between its normal operating position and its discharging position.
Figure 8:
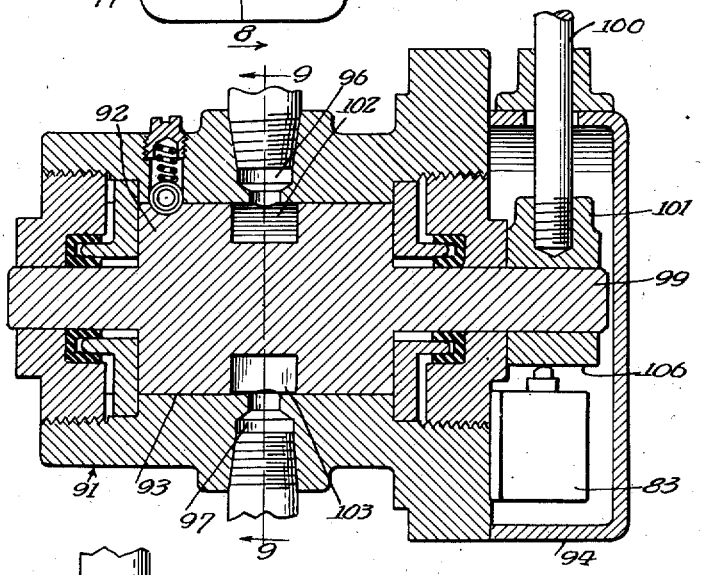
Figure 8 is an enlarged vertical longitudinal sectional view of the control valve, taken on the line 8—8 of Figure 7.
Figure 9:
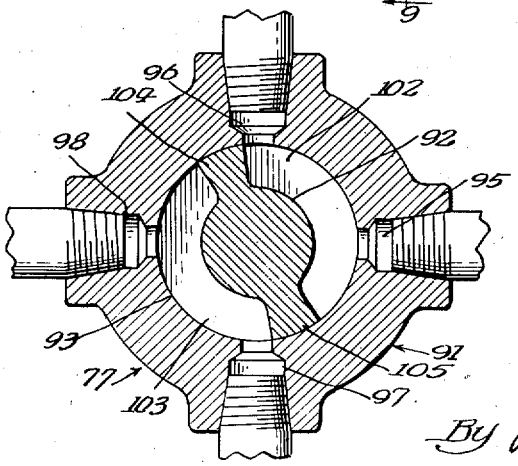
Figure 9 is a vertical transverse section of the valve taken on the line 9—9 of Figure 8.

The control valve 77 is mounted on the upper extremity of the front arm 25 of the standard 21 and comprises a horizontally elongated casing 91 and a cylindrical plug 92. The casing extends at right angles to the standard 21 and has the inner end thereof fixedly secured in any suitable manner to the upper extremity of the front arm 25 of said standard. It embodies a cylindrical centrally disposed longitudinally extending bore 93 and has a cup shaped sheet metal case 94 at its outer end. In addition to the case the casing 91 of the control valve 77 has four ports 95, 96, 97 and 98. As shown in Figure 9, the ports 95 and 98 are formed in the side portions of the casing 91, are positioned one diametrically opposite the other and lead outwards from the cylindrical bore 93. The port 96 is formed in the upper portion of the control valve casing 91 and communicates with, and leads outwards from, the bore 93. The fourth port, i. e., port 97, is formed in the bottom portion of the casing 91, communicates with the bore 93 and is positioned diametrically opposite the port 96. The plug 92 fits rotatably in the bore 93 and has at its outer end a stem 99 which, as shown in Figure 8, projects into the cup shaped case 94 on the outer end of the valve casing 91. An upstanding lever 100 serves as a medium for rotating the plug 92. The lower end of the lever is disposed in the case 94 and is connected to the outer end of the stem 99 by a collar 101. As shown in Figure 8, the central portion of the lever extends through an arcuate slot in the annular cylindrical side wall of the case 94. The plug 92 of the control valve embodies a pair of oppositely disposed arcuate grooves 102 and 103 and these are positioned in alignment with the ports in the valve casing and are separated by a pair of lands 104 and 105. The lands are arranged so that when the lever 100 is positioned vertically in what may be termed a neutral position the land 104 closes the port 96 and the land 105 closes the port 97. The arcuate grooves 102 and 103 are so arranged that when the lever 101 is swung in a clockwise direction as viewed in Figure 7 the groove 102 establishes communication between the ports 95 and 97 and the groove 103 establishes communication between the ports 96 and 98. The two grooves are also arranged that when the lever is swung in a counterclockwise direction from its neutral position the groove 102 establishes communication between the ports 95 and 96 and the groove 103 establishes communication between the ports 97 and 98. The switch 83 for controlling operation of the gear pump driving electric unidirectional motor 76 is disposed in the lower portion of the case 94 and is positioned so that the push button 88 thereof is located under the collar 101 between the lower end of the lever 100 and the outer end of the plug stem 99. The collar is provided at the bottom thereof with a flat 106 against which the switch button 88 abuts when the lever and plug are in their neutral position wherein the land 104 closes the port 96 and the land 105 closes the port 97. When the push button is in engagement with the flat the switch 83 is in its open position and the pump driving motor 80 is, therefore, inoperative. When the flat 106 is rotated out of engagement with the switch button 88 in connection with either clockwise or counterclockwise swinging of the lever 100, the collar 101 operates to depress the button and hence closes the switch and results in operation of the motor 80 and resultant drive of the gear pump 76.

Figure 5:
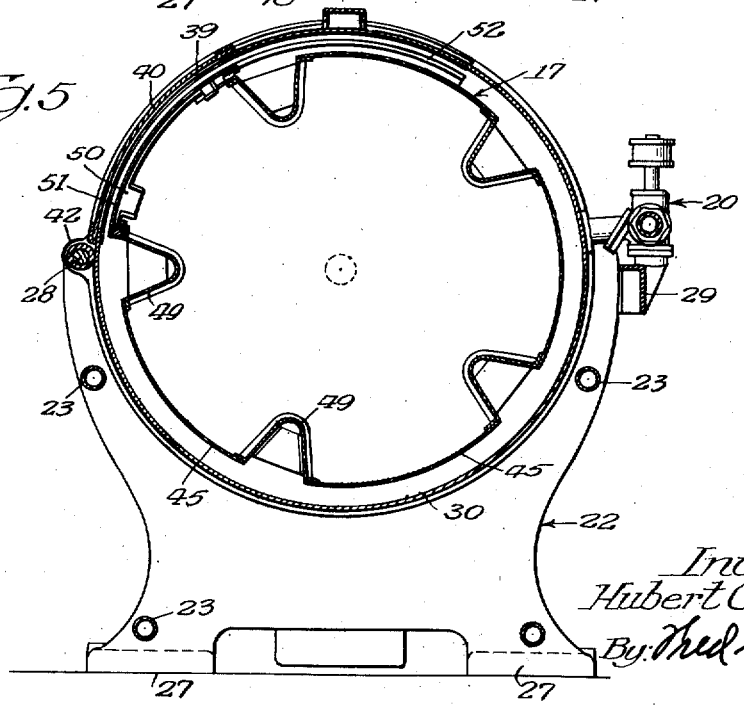
Figure 5 is a vertical transverse section on the line 5—5 of Figure 1.
Figure 10:
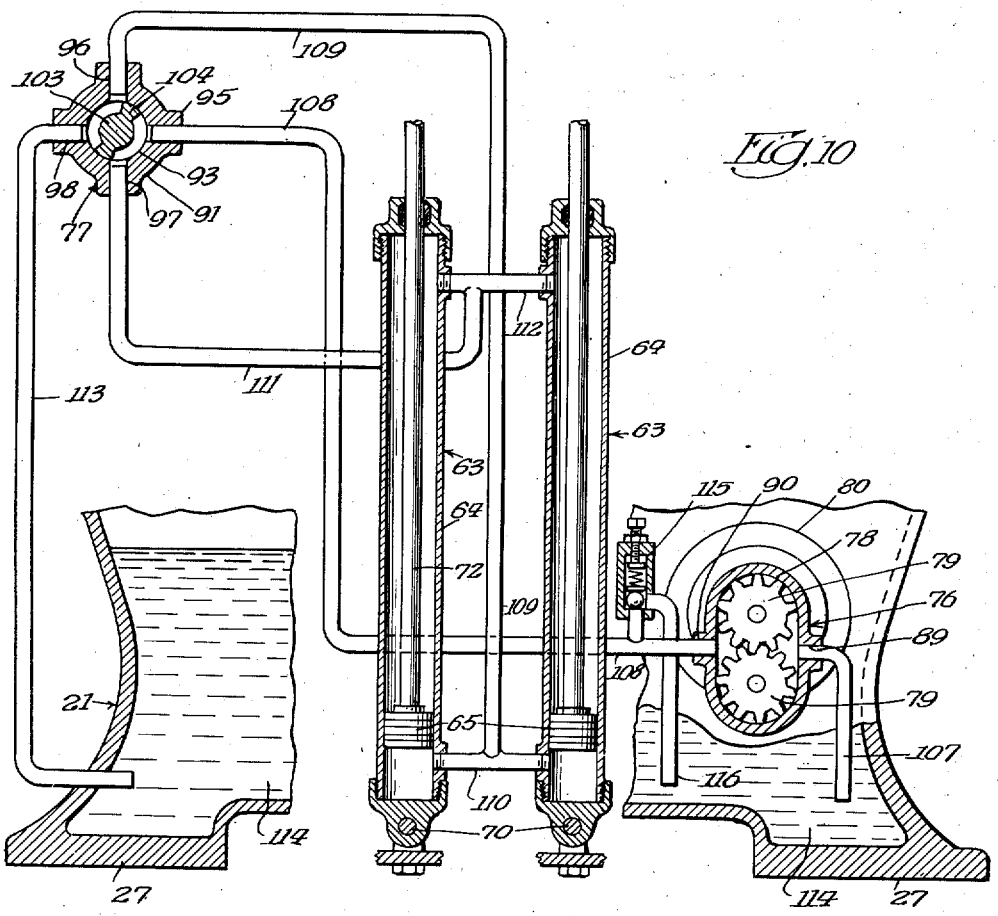
Figure 10 is a diagrammatic view of the hydraulic system.
Figure 11:
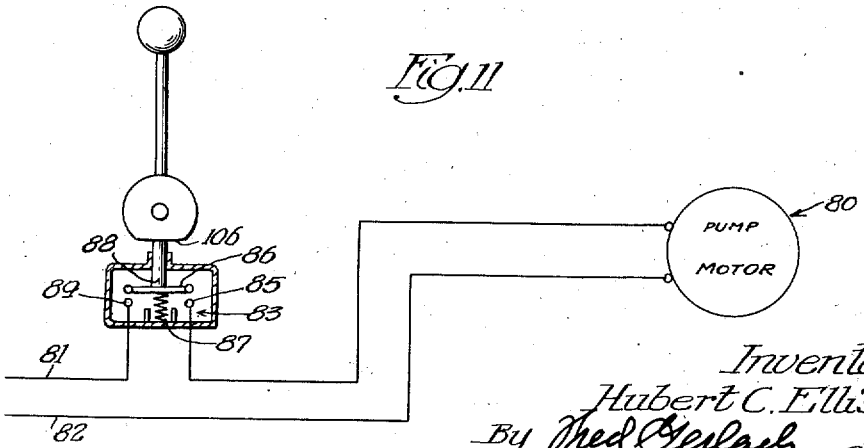
Figure 11 is a diagrammatic view of the electrical circuit for the gear pump driving electric motor of the hydraulic system.
Figure 12:
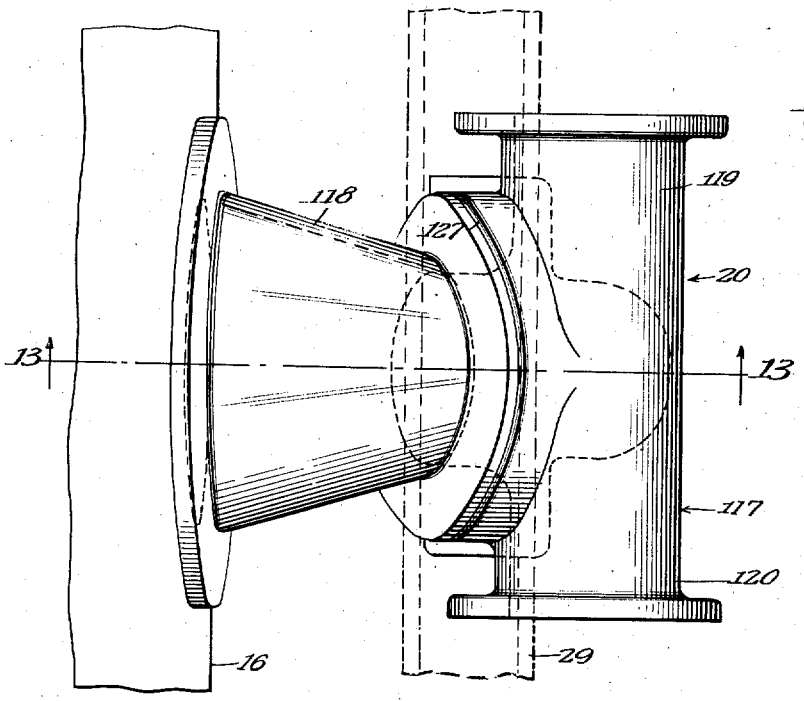
Figure 12 is a plan view of the fitting and pipe section constituting the means for supplying the outer shell with water.
Figure 13:
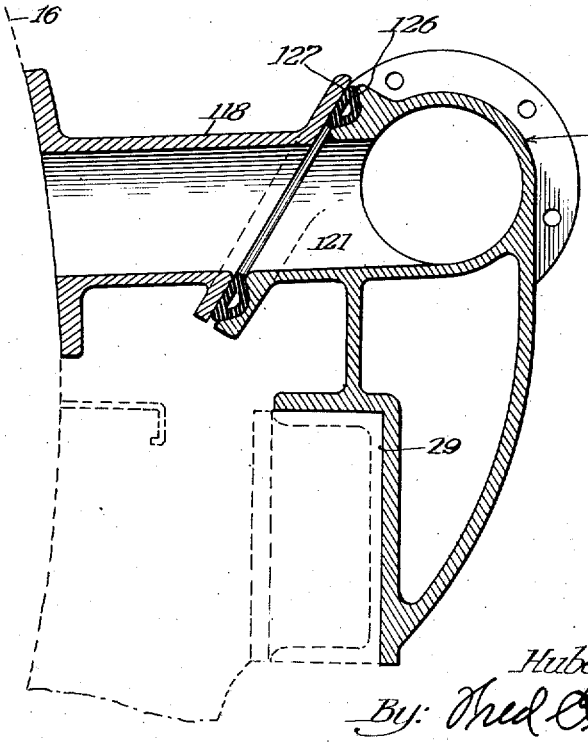
Figure 13 is a section on the line 13—13 of Figure 12.

The pipe arrangement constituting part of the hydraulic system 19 for swinging the outer shell together with the inner shell and the power mechanism back and forth between its normal operating position and its discharging position comprises pipes 107, 108, 109, 110 111, 112 and 113. One end of the pipe 107 leads to the base portion 24 of the standard 21 and the other end of the pipe 107 is connected to the inlet port 89 in the casing 78 of the gear pump 76. The base portion 24 of the standard 21 is hollow and, as shown in Figure 5, forms a reservoir 114 for a body or column of oil. Said other end of the pipe 107 is so positioned that it communicates with the lower portion of the body or column of oil in the reservoir 114. The pipe 108 extends between the gear pump 76 and the valve 91. One end of the pipe 108 is connected to the outlet port 90 in the gear pump casing 78 and the other end of said pipe is connected to the port 95 in the casing 91 of the control valve 77. The pipe 109 is connected to, and leads from, the port 96. The pipe 110 is in the form of a branch pipe. It is connected to the discharge end of the pipe 109 and has its ends connected to the lower ends of the cylinders 64 of the cylinder and piston devices 63. The pipe 111 is connected to, and leads from, the port 97 in the control valve casing 91. The pipe 112 is in the form of a branch pipe as shown in Figure 10. It is connected to the discharge end of the pipe 111 and leads to the upper ends of the cylinders 64. The pipe 113 serves as a return pipe and has one end thereof connected to the port 98 and its other end leading into the reservoir 114 in the base portion 24 of the standard 21. When the valve controlling lever 100 is swung in a counterclockwise direction from its neutral or vertical position so as to cause the plug groove 102 to establish communication between the ports 95 and 96 and the groove 103 to establish communication between the ports 97 and 98, the switch 83 is automatically closed, as hereinbefore pointed out, and as a result sets in operation the motor 80 which, in turn, drives the pump 76 so that it supplies oil under pressure into the lower ends of the cylinders 64 via pipe 108, port 95, plug groove 102, port 96, pipe 109 and branch pipe 110. As soon as the oil under pressure is introduced into the lower ends of the cylinder 64 the pistons 65 move upwards and operate through the medium of the piston rods 72 to swing the outer shell 16 together with the parts associated therewith upwards and forwards into its discharging position wherein, as previously pointed out, the opening 39 faces downwards. During the up stroke of the two pistons the upper ends of the cylinders are vented and the oil above the pistons flows back to the reservoir 114 via branch pipe 112, pipe 111, port 97, groove 103, port 98 and return pipe 113. When the lever 100 is swung from its neutral or vertical position in a clockwise direction as viewed in Figures 7 and 10, so as to cause the plug groove 102 to establish communication between the ports 95 and 97 and the groove 103 to establish communication between the ports 97 and 98, the switch 83 is automatically closed and sets in motion the unidirectional electric motor 80 which in turn drives the gear pump 76 so that the latter pumps oil under pressure into the upper ends of the cylinders 64 via pipe 108, port 95, groove 102, port 97, pipe 111 and branch pipe 112. Entrance of fluid under pressure into the upper ends of the cylinders 64 of the cylinder and piston devices 63 results in the pistons 65 sliding downwards and causing the outer shell 16 to swing rearwards and downwards into its normal operating position. During downward sliding movement of the pistons in the cylinders the lower ends of the cylinders are vented and the oil beneath the pistons flows back to the reservoir 114 via the branch pipe 110, pipe 109, port 96, groove 103, port 98 and return pipe 113. When the control lever 100 is in its neutral position wherein the lands 104 and 105 close, respectively, the ports 96 and 97, the switch 83 is in its open position and the oil in the cylinders is locked with the result that the pistons remain stationary and hold the outer shell 16 in a fixed position. The pipe 108 between the outlet port 90 in the pump casing 78 and the port 95 in the valve casing 91 is provided with a relief valve 115, the outlet port of which communicates with the reservoir 114 by way of a pipe 116. In the event that excessive pressure develops in the pipe 108 as a result of the operator of the machine failing to return the lever 100 to its neutral position after the outer shell 16 has been swung into its discharging position or into its normal operating position the relief valve 115 opens and the oil which is pumped by the gear pump flows back into the reservoir 114 via the pipe 116.

The means 20 for supplying the outer shell 16 with water when the outer shell is in its normal operating position comprises a T fitting 117 and a pipe section 118. The T fitting 117 consists of a pair of aligned inlet branches 119 and 120 and an intermediate outlet branch 121 and is fixedly mounted on the central portion of the bar 29 of the supporting structure 15 so that the inlet branches are disposed in parallel relation with the outer shell 16 and the outlet branch 121 extends horizontally towards the outer shell. The inlet branch 119 of the T fitting is connected to a hot water pipe 122 by way of a valve 123 and the inlet branch 120 is connected to a cold water pipe 124 by way of a valve 125. The outer end of the outlet branch 121 of the fitting 117 is canted so that it is inclined upwards and rearwards and has an annular groove 126 with a sealing gasket 127 therein. The pipe section 118 is fixedly connected to the central rear portion of the side wall 30 of the outer shell 16 and communicates with the interior of the outer shell. The outer or rear end of the pipe section 118 is canted so that it is inclined downwards and forwards, and is so arranged that it seats against the gasket 127 when the outer shell 16 is in its normal operating position. As a result of the manner in which the outer end of the outlet branch 121 and the rear end of the pipe section 118 are canted the pipe section is free to swing with the outer shell in connection with swinging of the latter into its discharging position. When the outer shell is in its normal operating position the pipe section 118 effects communication between the T fitting 117 and the interior of the outer shell and hence water may be introduced into the interior of the inner shell from hot water pipe 122 or cold water pipe 124, or both pipes.

When the outer shell 16 is in its normal operating position and it is desired to use the machine the door 40 is first slid upwards into its open position wherein it exposes the opening 39 in the front upper portion of the side wall 30 of the outer shell. Thereafter the inner shell 17 is rotated by proper control of the power mechanism 18 into a position wherein the opening 50 in the side wall 45 thereof is in registry with the opening 39 in the side wall of the outer shell. Thereupon the door 51 for the opening 50 is slid into its open position and the interior of the inner shell is charged with clothes and other articles to be washed via the openings 39 and 50. After charging of the inner shell the doors 51 and 40 are closed and water is introduced into the outer shell by way of the fitting 117 and the pipe section 118. After filling the outer shell to the desired height the power mechanism 18 is set in motion by supplying current to the three phase reversible motor 53. During operation of the motor the inner shell 17 within the outer shell rotates back and forth for clothes washing purposes. After the clothes have been washed the power mechanism 18 is stopped and the dump valve 38 is opened so as to discharge the water from the interior of the inner shell. Thereafter the door 40 is opened and the inner shell is rotated until its opening 50 is in registry with the opening 39 in the side wall of the outer shell. Upon effecting registration of the openings 50 and 39 the door 51 is opened and the lever 100 is swung in a counterclockwise direction as viewed in Figures 7 and 10. Such swinging of the lever 100 results in oil under pressure being introduced into the lower ends of the cylinders 64 of the cylinder and piston devices 63 and the pistons 65 being slid upwards and effecting, through the medium of the piston rods 72, upward and forward swinging of the outer shell 16 into its discharging position. As soon as the outer shell reaches such position the clothes are automatically discharged by gravity through the openings 50 and 39. After the discharging operation the lever 100 is swung to its fullest extent in a clockwise direction as viewed in Figures 7 and 10 in order to cause the oil under pressure to be introduced into the upper ends of the cylinders 64 and the pistons 65 resultantly to slide downwards and effect return of the outer shell to its normal operating position. As soon as the outer shell is swung into its normal operating position wherein it is supported by the pins 43 and the hooks 44 the operator of the machine swings the lower 100 into its neutral or vertical position so as to discontinue drive of the gear pump 76.

The herein described washing machine effectively and efficiently fulfills its intended purpose and may be operated with great facility and speed. It is automatic so far as discharge of the washed clothes and other articles is concerned and is characterized by the fact that the power mechanism 18 for operating the inner shell is entirely mounted on the outer shell and hence is always in operative or driving relation with the inner shell regardless of whether the outer shell is in its normal operating position or its discharging position.

The invention is not to be understood as restricted to the details set forth since these may be modified within the scope of the appended claims without departing from the spirit and scope of the invention.

Having thus described the invention, what I claim as new and desire to secure by Letters Patent is:

1. A washing machine of the character described, comprising a supporting structure, an outer shell having an access opening therein and provided with means whereby it is mounted on the supporting structure so that it is capable of being moved bodily back and forth between a normal operating position wherein the access opening faces upwards and a discharging position wherein the access opening faces downwards, an inner shell within the outer shell provided with a door closed access opening, adapted to hold the articles to be washed and supported so that it is rotatable relatively to the outer shell, and power mechanism for rotating the inner shell, mounted entirely on, and movable bodily with, said outer shell.

2. A washing machine of the character described, comprising a supporting structure, a horizontally elongated outer shell having an access opening in the side wall thereof and provided with means whereby it is mounted on the supporting structure so that it is capable of being swung bodily about a horizontal axis back and forth between a normal operating position wherein the access opening faces upwards and a discharging position wherein the access opening faces downwards, a horizontally elongated inner shell within the outer shell provided with a door closed access opening, adapted to hold the articles to be washed and supported at its ends so that it is rotatable relatively to the outer shell, and power mechanism for rotating the inner shell, mounted entirely, and movable bodily with, said outer shell.

3. A washing machine of the character described, comprising a supporting structure, a cylindrical horizontally extending outer shell having an access opening in the side wall thereof, adapted normally to assume an operating position wherein said opening faces forwards and upwards and pivotally mounted on the supporting structure so that it is capable of being swung bodily about a horizontal axis upwards and forwards from its normal operating position into a discharging position wherein said opening faces downwards, and then back again, a cylindrical horizontally extending inner shell for the articles to be washed positioned concentrically within the outer shell, provided with a door closed access opening in its side wall and supported at its ends so that it is rotatable relatively to the outer shell, and power mechanism for rotating the inner shell, mounted entirely on, and movable bodily with, said outer shell.

4. A washing machine of the character described, comprising a supporting structure in the form of a pair of laterally spaced U-shaped standards, a cylindrical horizontally extending outer shell extending lengthwise between the standards, having an access opening in its side wall, adapted normally to assume an operating position wherein the access opening faces upwards and forwards and having the front portion thereof pivotally connected to the front arms of the standards so that it is capable of being swung upwards and forwards into a discharging position wherein said access opening faces downwards, and then back again into said operating position, means between the rear portion of the outer shell and the rear arms of the standards for supporting said outer shell when it is in its operating position, a cylindrical horizontally extending inner shell for the articles to be washed positioned concentrically within the outer shell, provided with a door closed access opening in its side wall and supported at its ends so that it is rotatable relatively to the outer shell, and power mechanism for rotating the inner shell, mounted entirely on, and movable bodily with, said outer shell.

5. A washing machine of the character described, comprising a supporting structure in the form of a pair of laterally spaced U-shaped standards and a shaft between the upper extremities of the front arms of the standards, a cylindrical horizontally disposed outer shell extending longitudinally between the two standards, provided with an access opening in its side wall, adapted normally to assume an operating position wherein the access opening faces forwards and upwards, and having the front portion thereof pivotally connected to the shaft so that it is capable of being swung upwards and forwards into a discharging position wherein said access opening faces downwards, and then back again into its said operative position, means between the rear portion of the outer shell and the upper extremities of the rear arms of the standards for supporting the outer shell in its normal operating position, a cylindrical horizontally extending inner shell for the articles to be washed positioned concentrically within the outer shell, provided with a door close access opening in its side wall and supported at its ends so that it is rotatable relatively to the outer shell, and power mechanism for rotating the inner shell, mounted entirely on and movable bodily with, said outer shell.

6. A washing machine of the character described, comprising a supporting structure, an outer shell having an access opening therein and provided with means whereby it is mounted on the supporting structure so that it is capable of being moved bodily back and forth between a normal operating position wherein the access opening faces upwards and a discharging position wherein the access opening faces downwards, an inner shell within the outer shell provided with a door closed access opening, adapted to hold the articles to be washed and supported so that it is rotatable relatively to the outer shell, power mechanism for rotating the inner shell, mounted entirely on, and movable bodily with, said outer shell, and power means for moving the outer shell together with the inner shell and power mechanism back and forth between said positions.

7. A washing machine of the character described, comprising a supporting structure, a horizontally elongated outer shell having an access opening in the side wall thereof and provided with means whereby it is mounted on the supporting structure so that it is capable of being swung bodily about a horizontal axis back and forth between a normal operating position wherein the access opening faces upwards and a discharging position wherein the access opening faces downwards, a horizontally elongated inner shell within the outer shell provided with a door closed access opening, adapted to hold the articles to be washed and supported at its ends so that it is rotatable relatively to the outer shell, power mechanism for rotating the inner shell, mounted entirely on, and movable bodily with, said outer shell, and hydraulic means between the supporting structure and outer shell for swinging said outer shell together with the inner shell and power mechanism back and forth between said positions.

8. A washing machine of the character described, comprising a supporting structure, a horizontally elongated outer shell having an access opening in the side wall thereof and provided with means whereby it is mounted on the supporting structure so that it is capable of being swung bodily about a horizontal axis back and forth between a normal operating position wherein the access opening faces upwards and a discharging position wherein the access opening faces downwards, a horizontally elongated inner shell within the outer shell provided with a door closed access opening, adapted to hold the articles to be washed and supported at its ends so that it is rotatable relatively to the outer shell, power mechanism for rotating the inner shell, mounted entirely on, and movable bodily with, said outer shell, and cylinder and cooperating piston means extending between the supporting structure and the outer shell and adapted to move said outer shell back and forth between said positions in response to delivery and withdrawal of an hydraulic medium to and from the cylinder.

9. A washing machine of the character described, comprising a supporting structure, a horizontally elongated outer shell having an access opening in the side wall thereof and provided with means whereby it is mounted on the supporting structure so that it is capable of being swung bodily about a horizontal axis back and forth between a normal operating position wherein the access opening faces upwards and a discharging position wherein the access opening faces downwards, a horizontally elongated inner shell within the outer shell provided with a door closed access opening, adapted to hold the articles to be washed and supported at its ends so that it is rotatable relatively to the outer shell, power mechanism for rotating the inner shell, and hydraulic means between the supporting structure and the outer shell for swinging said outer shell back and forth between said positions, embodying an upstanding cylinder and coacting piston device having the lower end thereof pivotally connected to the supporting structure and its upper end connected to said outer shell.

10. A washing machine of the character described comprising a supporting structure, a horizontally elongated outer shell having an access opening in the side wall thereof and provided with means whereby it is mounted on the supporting structure so that it is capable of being swung bodily about a horizontal axis back and forth between a normal operating position wherein the access opening faces upwards and a discharging position wherein the access opening faces downwards, a horizontally elongated inner shell within the outer shell provided with a door closed access opening, adapted to hold the articles to be washed and supported at its ends so that it is rotatable relatively to the outer shell, power mechanism for rotating the inner shell, mounted entirely on, and movable bodily with, said outer shell, and hydraulic means between the supporting structure and outer shell for swinging said outer shell together with the inner shell and power mechanism back and forth between said positions, and embodying an upstanding cylinder having the lower end thereof pivotally connected to the supporting structure and a piston slidably mounted in the cylinder and provided with an upstanding piston rod with the upper end thereof pivotally connected to said outer shell.

11. A washing machine of the character described, comprising a supporting structure, a cylindrical horizontally extending outer shell having an access opening in the side wall thereof, adapted normally to assume an operating position wherein said opening faces forwards and upwards, and pivotally mounted on the supporting structure so that it is capable of being swung bodily about a horizontal axis upwards and forwards from its normal operating position into a discharging position wherein said opening faces downwards, and then back again, a cylindrical horizontally extending inner shell for the articles to be washed positioned concentrically within the outer shell, provided with a door closed access opening in its side wall and supported at its ends so that it is rotatable relatively to the outer shell, power mechanism for rotating the inner shell, and hydraulic means for swinging the outer shell back and forth between its positions embodying a pair of upstanding cylinder and piston devices positioned outwards of the end walls of the outer shell and having the lower ends thereof pivotally connected to the supporting structure and their upper ends pivotally connected to said end walls of the outer shell.

12. A washing machine of the character described, comprising a supporting structure in the form of a pair of laterally spaced U-shaped standards, a cylindrical horizontally extending outer shell extending lengthwise between the standards, having an access opening in its side wall, adapted normally to assume an operating position wherein the access opening faces upwards and forwards and having the front portion thereof pivotally connected to the front arms of the standards so that it is capable of being swung upwards and forwards into a discharging position wherein said access opening faces downwards, and then back again into said operating position, means between the rear portion of the outer shell and the rear arms of the standards for supporting said outer shell when it is in its operation position, a cylindrical horizontally extending inner shell for the articles to be washed positioned concentrically within the outer shell, provided with a door closed access opening in its side wall and supported at its ends so that it is rotatable relatively to the outer shell, power mechanism for rotating the inner shell and hydraulic means for swinging the outer shell back and forth between said positions embodying a pair of upstanding cylinder and cooperating piston devices positioned adjacent the standards, respectively, and having the lower ends thereof pivotally connected to the lower portions of the standards and their upper ends pivotally connected to the end walls of said outer shell.

13. A washing machine of the character described, comprising a supporting structure in the form of a pair of laterally spaced U-shaped standards and a shaft between the upper extremities of the front arms of the standards, a cylindrical horizontally disposed outer shell extending longitudinally between the two standards, provided with an access opening in its side wall, adapted normally to assume an operating position wherein the access opening faces forwards and upwards, and having front portion thereof pivotally connected to the shaft so that it is capable of being swung upwards and forwards into a discharging position wherein said access opening faces downwards, and then back again into its said operative position, means between the rear portion of the outer shell and the upper extremities of the rear arms of the standards for supporting the outer shell in its normal operating position, a cylindrical horizontally extending inner shell for the articles to be washed positioned concentrically within the outer shell, provided with a door closed access opening in its side wall and supported at its ends so that it is rotatable relatively to the outer shell, power mechanism for rotating the inner shell, mounted entirely on, and movable bodily, with said outer shell, and hydraulic means for swinging the outer shell back and forth between said positions, embodying a pair of cylinder and coacting piston devices positioned outwards of the standards, respectively, and having the lower ends thereof pivotally connected to the lower portions of the standards and the upper ends pivotally connected to the central portions of the end walls of the outer shell.

14. A washing machine of the character described, comprising a supporting structure in the form of a pair of laterally spaced U-shaped standards and a bar between the upper extremities of the rear arms of the standards, a cylindrical horizontally disposed outer shell extending lengthwise between the standards, having an access opening in its side wall, adapted normally to assume an operating position wherein the access opening faces upwards and forwards and having the front portion thereof pivotally connected to the front arms of the standards so that it is capable of being swung upwards and forwards into a discharging position wherein said access opening faces downwards, and then back again into said operating position, a cylindrical horizontally extending foraminous inner shell for the articles to be washed positioned concentrically within the outer shell, provided with a door closed access opening in its side wall and supported at its ends so that it is rotatable relatively to the outer shell, power mechanism for rotating the inner shell, and means for supplying the outer shell with a washing fluid comprising a fitting mounted rigidly on the bar and provided with an outlet facing towards the side wall of the outer shell, and a separate pipe section connected rigidly to the side wall of, and in communication with the interior of, the outer shell and arranged and positioned so that it is automatically swung into registry with the fitting outlet when the outer shell is bodily swung from its discharging position into its normal operating position.

15. A washing machine of the character described, comprising a supporting structure, an outer shell having an access opening therein and provided with means whereby it is mounted on the supporting structure so that it is capable of being moved bodily back and forth between a normal operating position wherein the access opening faces upwards and a discharging position wherein the access opening faces downwards, an inner shell within the outer shell provided with a door closed access opening, adapted to hold the articles to be washed and supported so that it is rotatable relatively to the outer shell, and power mechanism operative to effect rotation of the inner shell and embodying an operating part mounted adjacent, and movable bodily with, said outer shell.

16. A washing machine of the character described, comprising a supporting structure, a horizontally elongated outer shell having an access opening in the side wall thereof and provided with means whereby it is mounted on the supporting structure so that it is capable of being swung bodily about a horizontal axis back and forth between a normal operating position wherein the access opening faces upwards and a discharging position wherein the access opening faces downwards, a horizontally elongated inner shell disposed within, and extending lengthwise of, the outer shell, provided with a door closed access opening, adapted to hold the articles to be washed and supported at its ends so that it is rotatable relatively to the outer shell, and motor actuated mechanism for rotating the inner shell, including an operating part mounted adjacent, and movable bodily with, said outer shell.

HUBERT C. ELLIS.

REFERENCES CITED

The following references are of record in the file of this patent:

UNITED STATES PATENTS

| Number | Name | Date |
|---|---|---|
| 154,860 | Golden | Sept. 8, 1874 |
| 295,715 | Baker | Mar. 25, 1884 |
| 912,028 | Siefert | Feb. 9, 1909 |
| 1,010,436 | Kenney | Dec. 5, 1911 |
| 1,128,722 | Renisch | Feb. 16, 1915 |
| 1,151,990 | Balzer | Aug. 31, 1915 |
| 1,400,977 | Perry | Dec. 20, 1921 |
| 1,793,845 | Dubord | Feb. 24, 1931 |